Sept. 30, 1924.  1,510,344

C. REINKER

AUTOMOBILE LAMP

Filed March 27, 1922

Inventor
CHRISTIAN REINKER

By Fisher, Moser & Cook
Attorneys

Patented Sept. 30, 1924.

1,510,344

UNITED STATES PATENT OFFICE.

CHRISTIAN REINKER, OF LAKEWOOD, OHIO.

AUTOMOBILE LAMP.

Application filed March 27, 1922. Serial No. 547,172.

*To all whom it may concern:*

Be it known that I, CHRISTIAN REINKER, a citizen of the United States, residing at Lakewood, in the county of Cuyahoga and State of Ohio, have invented certain new and useful Improvements in Automobile Lamps, of which the following is a specification.

This invention relates to automobile lamps and has for an object to utilize a portion of the light from the headlight or any other lamp on the automobile which would otherwise be wasted to illuminate the sides of the automobile at the rear of the headlight or lamp whereby the sides of the car are made visible and glare minimized to drivers of passing cars and danger of side collisions is lessened, and whereby the running board and the roadway at the side of the car are illuminated making it safer and more convenient for persons entering and alighting from the car. A further object is to confine the light radiated rearwardly to the lower portions of the car body so that eyes of the driver are not subjected to the glare. A further object is to provide adjustable light reflecting means whereby the rearwardly radiated light can be directed at different angles either to illumine the mechanism within the hood or to direct the light along the side of the car. Other objects will be apparent from the following description in connection with the annexed drawings.

Figure 1:
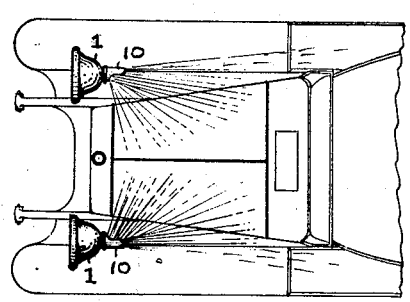
Figure 4:
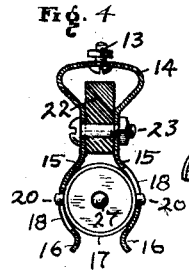
Figure 5:
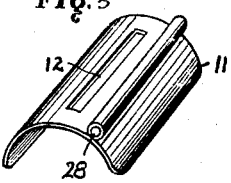
Figure 2:
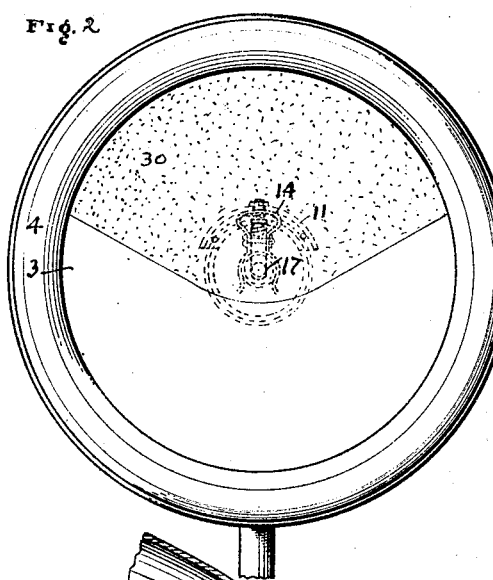
Figure 3:
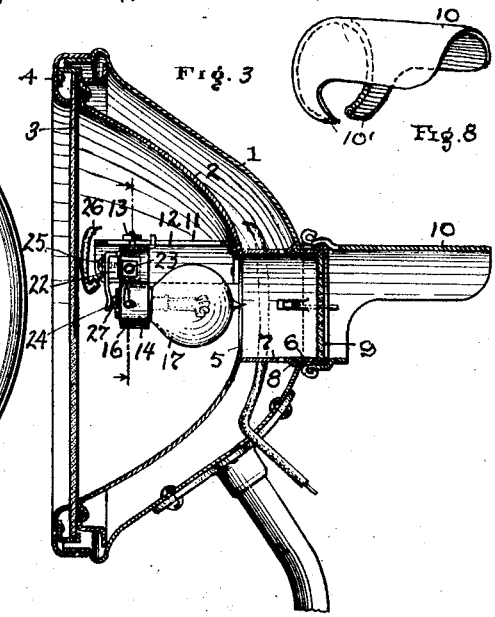

In said annexed drawings:

Fig. 1 is a top plan view of the front portion of an automobile having the improved headlights thereon. Fig. 2 is a front elevation of the headlight. Fig. 3 is a vertical axial section through the headlight. Fig. 4 is a detail sectional view of the lamp socket supporting clip. Fig. 5 is a view in perspective of the lamp shield.

Figure 8:
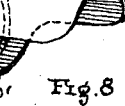
Figure 6:
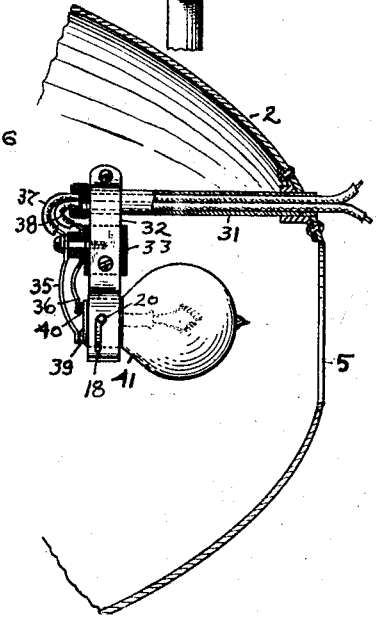
Figure 7:
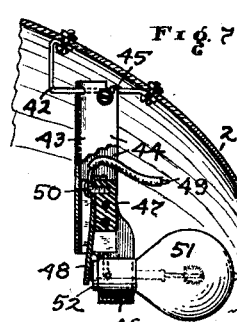
Figure 9:
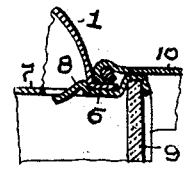

Fig. 6 is a fragmentary vertical section showing a modified form of lamp support. Fig. 7 is a fragmentary vertical section showing still another modification of the lamp support. Fig. 8 is a perspective view of a modified form of light deflector. Fig. 9 is a sectional view, enlarged, of a detail involving the union of the light tube and deflector with the rear end of the lamp body.

Referring to the annexed drawing, the lamp or head-light consists of an outer housing 1 having an open front, a parabolic reflector 2 within the housing 1 having its front edge portion formed to provide a seat for the lens 3 fitting within the outer edge of the housing 1, and an annular retaining band 4 for securing the lens 3 against the outer edge of the reflector 2. In a small lamp, the reflector 2 may be omitted but where present it is provided with an axial circular aperture 5 and the housing 1 has a flanged aperture 6 of slightly greater diameter. A cylindrical tube or casing 7 fits within the aperture 6 of the housing 1 and has its forward edge in engagement with the reflector 2 around the aperture 5 therein. The inner wall or housing 1 at the edge of the aperture 6 may be engaged by spring clips 8 formed by striking up and bending integral tongue portions outwardly from the wall of the tube or casing 7, which may have its outer end project beyond the rear of the housing 1 to support a lens 9 secured therein in any suitable way. An arcuate shield or light reflector 10 having an inner reflecting surface is rotatably mounted upon the flanged portion of housing 1 and the beaded end of tube 7, see Fig. 9, and this shield or deflector 10 may have spring clamping portion 10' as shown in Fig. 8, or it may be constructed in any other way adapted to permit it to be rotated and to be attached and detached.

A supporting guard plate 11 is mounted within reflector 2 opposite rear opening 5, and this plate has a longitudinal slot 12 in its central portion in which is adjustably secured a bolt 13 from which is suspended a spring clip 14 made from a strip of resilient sheet-metal bent to U-shape to provide depending arms 15 having curved lower ends 16 adapted to form spring gripping jaws for holding the round base end of an electric lamp 17. The jaws 16 have L slots 18 therein adapted to receive diametrically opposed lugs 20 on the lamp base and located between the arms 15 above the jaws 16 is a block 22 of insulating material secured by a bolt 23, see Fig. 4. The block 22 has a contact strip 24 secured to its front face by a screw 25, see Fig. 3, which serves as a binding post for a wire conductor 26. The lower end of contact strip 24 engages a central contact 27 at the rear end of the base of electric lamp 17, and a tube 28 forms a conduit for the conductor 26 at the top of the shield or supporting plate 11. Current is supplied to lamp 17 through the conductor 26, strip 24 and contact 27, and a ground connection is made through the side wall of the lamp base, spring clip 14, metal plate 11 and housing 1. Lamp 17 is supported with its bulb end projected rearwardly and its axis co-incident with the axis of the reflector 2, and holder 14 is adjustable along this axis so that the lamp filament may be set at the proper focal point of reflector 2. In some headlights the upper portion 30 of the lens 3 is rendered opaque to lessen the glare of the headlight, and where this opaque portion 30 extends below the center of the lens the support 11, holder 14 and lamp 17 are concealed. In such cases that portion of the light which is cut off from the front by opaque portion is radiated partly directly through the rear lens 9 from lamp 17 and utilized without materially impairing the strength of the beam of light projected forwardly through the lower half of the lens 3.

When the rear reflector 10 is positioned at the top side of the rear lens 9 as shown in Fig. 3 the light rays issuing from lamp 17 are directed downwardly upon the running board and rearwardly alongside the car. When it is desired to inspect the mechanism or engine within the hood one or both of the reflectors can be turned to direct the light toward the hood and engine as shown in Fig. 1. The light shed through the rear of lamp body 1 also lessens glare effects at the front. In Fig. 6 is shown a modified form of lamp-support in which a tube 31 is secured at its rear end to reflector 2 above aperture 5. A lamp holder 32 similar to clip 14 is clamped to the tube 31 and is adjustable longitudinally thereon. A block of insulating material 33 is secured to holder 32, and a pair of contact strips 35 and 36 are mounted on block 33 and connected to wires 37 and 38 which are adapted to pass rearwardly through the tube 31. The strips 35 and 36 engage separate end contacts 39 and 40 on the base of the lamp or bulb 41, which is a different type than lamp 17. In Fig. 7 I show still another form of lamp support comprising an angle bracket 42 secured to the reflector 2 and a lamp holder 43 of U-shape slotted and slidably connected at its upper end to the bracket 42 and having a transverse screw 45 for clamping the holder in adjusted position. A pair of spring jaws 46 similar to jaws 16 of holder 14 extend downwardly from the sides of holder 43, and between the sides 44 is secured an insulating block 47 to which is connected a contact strip 48 held in place on the block 47 and connected with a wire 49 by a screw 50. The lamp 51 has an end contact 52 engaging strip 48, and a ground connection is made through the holder 43, bracket 42, and reflector 2. The lamp is projected rearwardly in each of the forms of mountings described, which is contrary to the customary practice, but of especial utility in a lamp where a portion of the light is transmitted through a smaller lens at the rear end of a body or housing 1 for the reasons and purposes herein described.

What I claim, is:

1. A headlight for automobiles, comprising a parabolic reflector; a lens at the front of said reflector having an opaque upper portion extending below the center thereof; an arcuate shield secured to said reflector above the axis thereof and extending forwardly; a lamp holder suspended from the outer end of said shield adjacent said lens; and a lamp in said holder facing the rear of said reflector, said reflector having a light transmitting opening and a lens at its rear opposite said lamp.

2. An automobile lamp, comprising a housing having an open front; a parabolic reflector fixedly mounted within said housing, a lens covering the open front of said housing; a relatively small lens mounted in the rear wall of said housing; and a rearwardly extending electric lamp bulb pointing toward said reflector, depending from said reflector and within the same and between said front and rear lenses in axial alinement with said rear lens and adapted to transmit light upon said reflector and through both said openings, said light adapted to be adjusted toward or away from said fixed reflector.

In testimony whereof I affix my signature to this specification.

CHRISTIAN REINKER.